US012098831B1

(12) United States Patent
Ben-Ezra et al.

(10) Patent No.: US 12,098,831 B1
(45) Date of Patent: Sep. 24, 2024

(54) SYSTEMS METHODS AND INTERNAL CONTROL DEVICES FOR WIRELESS LIGHT-FIXTURES CONTROL

(71) Applicant: Tondo Smart LTD., Or Yehuda (IL)

(72) Inventors: Micha Ben-Ezra, Or Yehuda (IL); Philip Desautels, Springvale, ME (US)

(73) Assignee: TONDO SMART LTD., Or Yehuda (IL)

( * ) Notice: Subject to any disclaimer, the term of this patent is extended or adjusted under 35 U.S.C. 154(b) by 0 days.

(21) Appl. No.: 18/311,252

(22) Filed: May 3, 2023

(51) Int. Cl.

| | |
|---|---|
| ***F21V 23/00*** | (2015.01) |
| ***H05B 45/14*** | (2020.01) |
| ***H05B 47/19*** | (2020.01) |
| *F21Y 115/10* | (2016.01) |

(52) U.S. Cl.
CPC ........... *F21V 23/008* (2013.01); *H05B 45/14* (2020.01); *H05B 47/19* (2020.01); *F21Y 2115/10* (2016.08)

(58) Field of Classification Search
CPC ........ F21V 23/008; H05B 45/14; H05B 47/19
See application file for complete search history.

(56) References Cited

U.S. PATENT DOCUMENTS

| | | | | |
|---|---|---|---|---|
| 2014/0160741 | A1* | 6/2014 | Blackstone | F21V 23/026 362/221 |
| 2020/0132288 | A1* | 4/2020 | Ouyang | F21V 23/023 |
| 2020/0187321 | A1* | 6/2020 | Kansal | F21V 17/005 |
| 2021/0359475 | A1* | 11/2021 | Mostoller | H05B 47/11 |
| 2022/0034496 | A1* | 2/2022 | Secretin | H05B 47/18 |
| 2024/0003529 | A1* | 1/2024 | Chinnam | H01R 33/94 |

* cited by examiner

*Primary Examiner* — Christopher E Dunay
(74) *Attorney, Agent, or Firm* — S. J. INTELLECTUAL PROPERTY; Avi Jencmen

(57) ABSTRACT

Systems and methods for enabling wireless control and communication between one or more internal control devices and one or more external devices for controlling one or more light fixtures. According to embodiments, the internal control device is configured to connect to a light fixture that includes at least: a casing forming a cavity therein and one or more lamp-connectors for connecting to one or more illuminators locatable within the cavity, the internal control device may include: (i) an internal controller configured at least to control operation of the one or more illuminators of the light fixture, and to wirelessly communicate with at least one external device, wherein the at least one external device is configured at least for controlling one or more operations of the internal controller; and (ii) a controller encasement configured to be locatable in the cavity of the light fixture, such that the internal controller is kept within the cavity of the light fixture, and wherein only an outer surface of the controller encasement is located over an outer surface of the casing of the light fixture.

22 Claims, 8 Drawing Sheets

SYSTEMS METHODS AND INTERNAL CONTROL DEVICES FOR WIRELESS LIGHT-FIXTURES CONTROL

TECHNICAL FIELD

The present invention relates to the field of illumination/lighting management and control and more particularly to devices, installable in a light fixture, for enabling wireless communication with one or more external control devices for wirelessly controlling and monitoring the light fixture based on wirelessly received and/or transmitted signals. More particularly, the invention relates to such devices, methods and systems, using control device(s) internally installable in cavity of light fixtures to disguise/camouflage the connected nature of the fixture and/or for weather protection.

BACKGROUND

There is a growing need for smart systems for smart street, house and/or road illumination-control for controlling various illumination related operational features of one or more light fixtures and/or illuminators for various purposes such as for smart and cost-effective utilization of illuminators, e.g., for energy conservation and efficiency optimization, for costs minimization, remote operation, control, programming, autonomous operation, easy installation and the like.

In most large-scale illumination-management systems the light fixtures that are used for outdoor illumination, are connected (hardwired) to a main electricity power grid for being powered, and to communication grid/line for being monitored and/or controlled. Light fixtures that are located outdoors require weatherproofing of their internal electrical/electronic/communication devices and parts as well as more complicated hardwiring layout and control.

Wireless illumination control is commonly used to control illumination of a number of illumination devices and improves: installation flexibility, scalability control, cost-effectiveness, energy control and conservation and more.

Wireless light controllers typically use radio-frequency (RF) based wireless communication for enabling wireless control of light fixtures by having an RF receiver installed on the light fixture for being wirelessly controlled via a remote switching device that uses a corresponding RF transmitter.

SUMMARY

Aspects of disclosed embodiments, pertain to an internal control device for connecting to a light fixture that includes at least a casing forming a cavity therein, one or more lamp-connectors for connecting to one or more illuminators locatable within the cavity, the internal control device comprising at least:

an internal controller configured at least to control operation of the one or more illuminators of the light fixture, wherein the internal controller is configured to wirelessly communicate with at least one external device, located externally in respect to the light fixture and in respect to the internal control device, wherein the at least one external device is configured at least for controlling one or more operations of the internal controller; and a controller encasement configured to encase at least part of the internal controller, the controller encasement being configured to be locatable in the cavity of the light fixture, wherein the controller encasement is configured to removably connect to the casing of the light fixture, such that the internal controller is kept within the cavity of the light fixture, and wherein only an outer surface of the controller encasement is located over an outer surface of the casing of the light fixture.

Other aspects of disclosed embodiments, pertain to an internal controller for controlling operation of a light fixture, the light fixture comprising a casing forming a cavity therein, one or more lamp-connectors for connecting to one or more illuminators all located within the cavity, wherein the internal controller is configured to control operation of the light fixture and to wirelessly communicate with at least one external device, external in respect to the internal controller and to lighting fixture, wherein the internal controller is locatable internally in respect to an inner side of the controller encasement and in respect to the light fixture, for preventing exposure of the internal controller to external environment, such that once the internal control device is positioned in the cavity of the light fixture, only an outer surface of the controller encasement is located over an outer surface of the casing of the light fixture.

Additional or alternative aspects of disclosed embodiments, pertain to a system for controlling one or more light fixtures, the system comprising at least:

(a) at least one external device, located externally to the one or more light fixtures, to the controller encasement and to the internal controller; and (b) at least one internal control device, each internal control device comprising at least:

(i) an internal controller configured at least to control operation of the one or more illuminators of the light fixture, wherein the internal controller is configured to wirelessly communicate with at least one external device, located externally in respect to the light fixture and internal control device, wherein the at least one external device is configured at least for controlling one or more operations of the internal controller; and (ii) a controller encasement configured to be locatable in the cavity of the light fixture, wherein the controller encasement is configured to removably connect to the casing of the light fixture, such that the internal controller is kept within the cavity of the light fixture, and wherein only an outer surface of the controller encasement is located over an outer surface of the casing of the light fixture, wherein the at least one external device is configured to wirelessly transmit signals or data to each internal controller of each internal control device for controlling operation at least of the one or more illuminators of each respective light fixture.

According to some embodiments, there is also provided a method for controlling one or more light fixtures, the method comprising at least:

providing an internal control device of any one or more of claims 1 to 20, for each light fixture of a group of light fixtures;

providing at least one external device configured to control each light fixture of the group by wirelessly communicating with each light fixture; and controlling operation at least of the one or more illuminators of each specific light fixture of the group at least by transmission of wireless signals to the specific light fixture.

According to some embodiments, the internal controller may include at least a communication unit such as at least one wireless receiver for supporting and enabling at least receiving of wireless signals such as RF signals from the at least one external device; and the external device includes an external communication unit including at least one wireless transmitter, for wirelessly transmitting signals to each internal controller of each light fixture for controlling each of the light fixtures.

According to some embodiments, the internal control device and/or the system may also include one or more sensors, for sensing one or more physical characteristics of the system, the internal controller of the internal control device, the light fixture (such as illumination properties of the light fixture, power supply of the light fixture, illumination properties of the group of fixtures of the system, external temperature and/or other weather related properties of the external environment of the system, etc.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 1A shows an exploded view of the internal control device; FIG. 1B and FIG. 1C show the internal control device when in a packed state;

DETAILED DESCRIPTION OF EMBODIMENTS

Figure 1A:
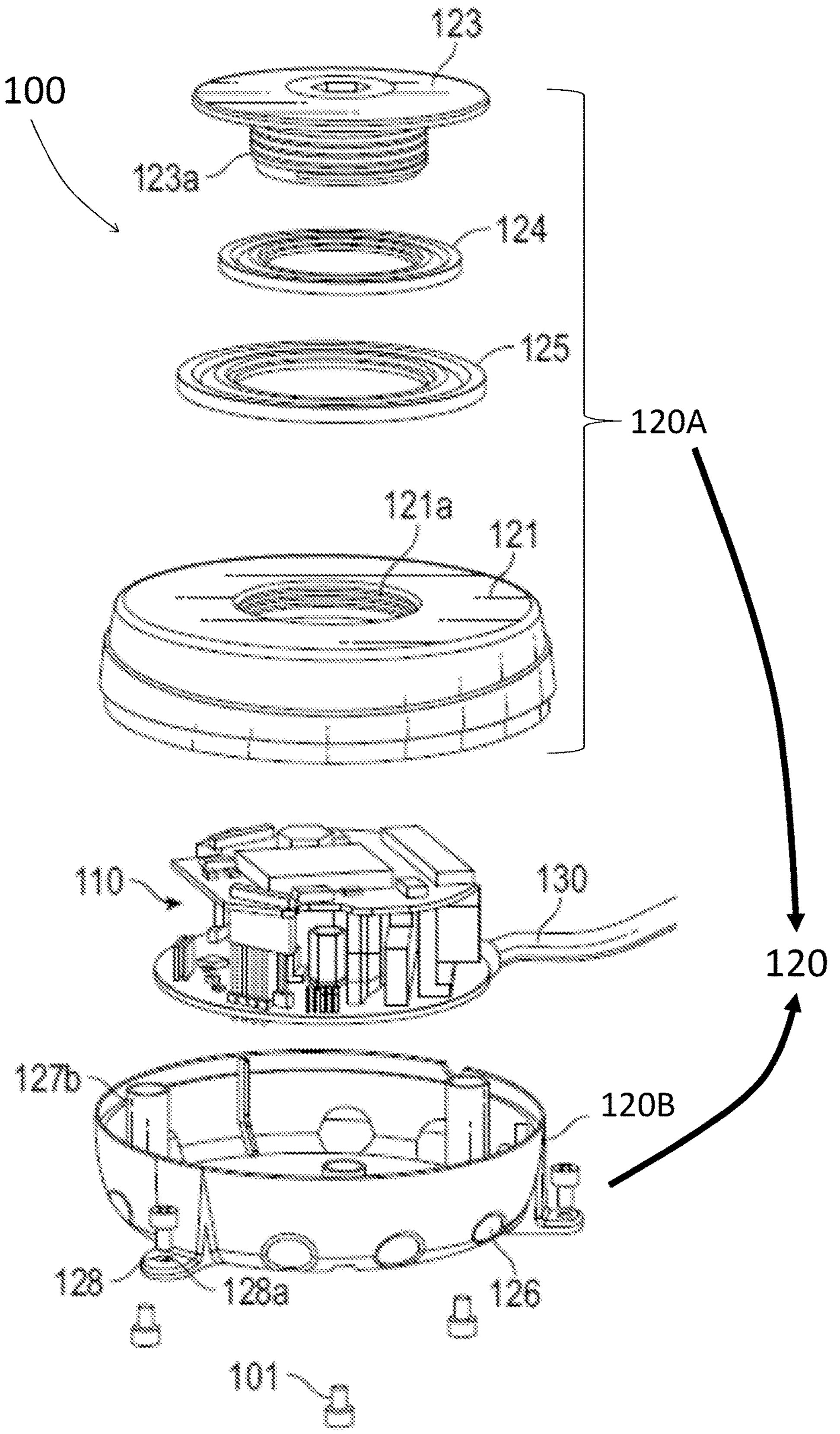
FIGS. 1A-1C show a schematic illustration of an internal control device for being internally installable in a cavity of a light fixture, according to some embodiments.

Aspects of disclosed embodiments, pertain to an internally installable wireless internal control device for installation within a cavity of a light fixture. The light fixture's cavity may be accessible via an opening in a casing of the light fixture. The internal control device may be configured to control operation of one or more devices/elements of the light fixture such as operational properties of one or more illuminators (lamps) of the light fixture and to wirelessly communicate with one or more external devices such as one or more external control devices, external to the light fixture for enabling external (remote) controlling of the light fixture by the external device and via the internal controller installed within the light fixture.

The internal control device may be connectable to a casing of the light fixture in a releasable manner such that it is weather-protected from the external environment, a portion of the internal control device is external to the light fixture, and also such that part of it that is an outer surface does not protrude from the outer surface of the light fixture's casing, minimizing visibility thereof and/or or camouflaging it from a viewer. In other cases, the internal control device's outer surface or part thereof only slightly protrudes from the outer surface of the light fixture's casing. Disclosed embodiments of internal control devices and systems may enable to retrofit existing designs of light fixtures that would have otherwise feature visible and/or external controllers by either adding an internal holder/socket to a casing or by installing the internal control device over an internal side of the casing of the light fixture thereby improving/enabling reducing/minimizing visibility of the control device for stealth/camouflage purposes and/or for improving weather/water-proofing of the internal controller and/or other parts/components of the internal control device sensitive to moisture, weather/temperature extremes/changes and/or water.

According to some embodiments, an external device may be configured and located such as to control more than one light fixture, for example to enable using a single main external control unit for controlling a group of light fixtures, located and configured to illuminate a designated illumination unit/area such as a street, a road section, a house, a building, a facility, a factory, etc.

In the detailed description, numerous specific details are set forth in order to provide a thorough understanding of some embodiments of the presently disclosed subject matter. However, the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "controlling". "monitoring", "analyzing", "processing", "communicating" and the like, and/or conjugations thereof, include action(s) and/or process(es) of a computation, communication and/or processing device such as a computer a digital board etc., that manipulates, stores, displays and/or transforms signals and/or data into other data, said data represented as physical quantities, e.g., such as electronic quantities, optical quantities (particles) and/or said data representing the physical objects. The terms "computer", "processor". "processing resource", "processing circuitry", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Figure 1B:
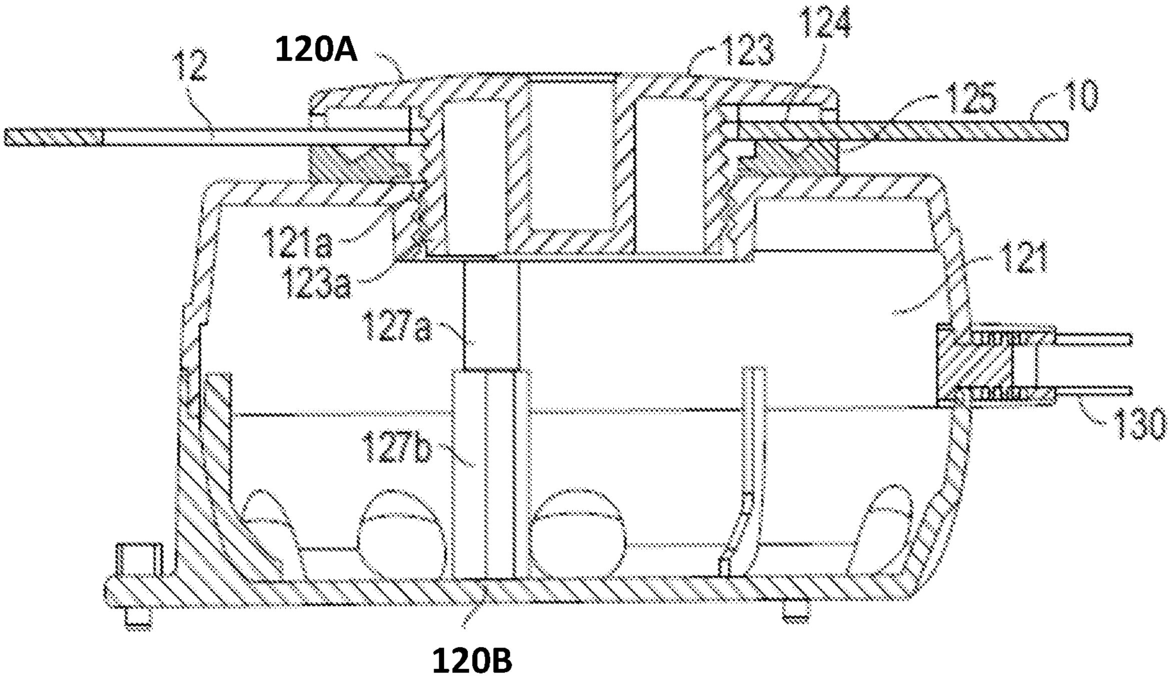
Figure 1C:
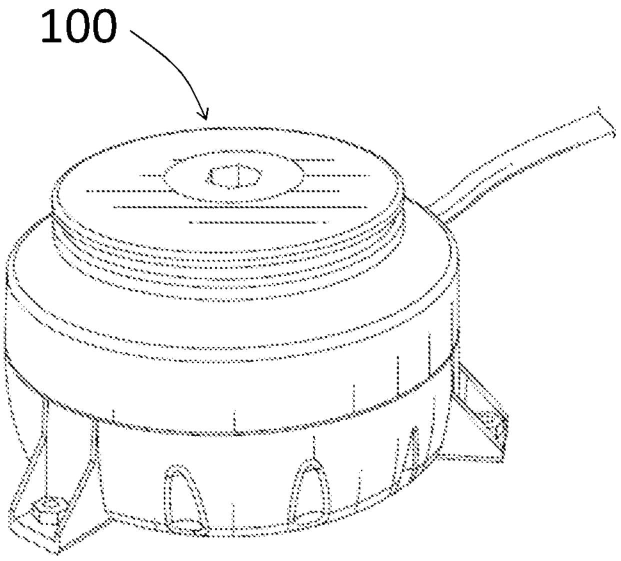

Reference is now made to FIGS. 1A-1C, schematically illustrating components of an internal control device 100, according to some embodiments, configured for being installed in a designated recess of a light fixture. The internal control device 100 may include:

(i) an internal controller 110 including all electronic, optical, electrical, digital, communication and/or software means, connectors and/or wires of the internal control device 100;

(ii) a controller encasement 120 including at least two main parts: a first member 120A and as second member 120B configured to releasably connect to one another such as to encase the internal controller 110, inside in a cavity/recess/pocket formed thereby; and one or more connecting means such as connecting mechanism 130 configured to connect the main elements of the internal controller 110 to one or more power lines/means of the light fixture, to one or more sensors, and/or to one or more lamp-connectors of the light fixture, each lamp-connector being configured to connect an illuminator (lamp/light emitting diode (LED) set/bar/bulb) of the light fixture to a power supply source/line.

According to some embodiments, the first member 120A of the controller encasement 120, comprises: a cover 121, a lid 123 and optionally also one or more sealing rings 124-125 for waterproofing/weatherproofing the internal control device 100 and optionally also for water/weather-proofing a casing of the light fixture.

According to some embodiments, as seen in FIG. 1A, the cover 121 includes an opening with a (female) screw-threaded inner wall 121*a* into which a protruding part 123*a* of the lid 123 (with corresponding design and dimensions) can be inserted (by screw threading the protruding part 123*a* using an external corresponding (male) screw-threading of the protruding part 123*a* through the corresponding (female) screw-threaded inner wall 121*a* of the cover 121.

The second member 120B may be releasably connectable to the first part 120A by using any releasable connecting/fastening means such as by using snap fastening means. For example, as shown in FIG. 1B, the first member 120A of the controller encasement 120 may include one or more elongated protruding members such as elongated protruding member 127*a* that is configured to be insertable into a corresponding socket 127*b* of corresponding inner dimensions and size for connecting the first member 120A to the second member 120Bb in a releasable manner.

According to some embodiments, as shown in FIG. 1A, the internal control device 100 can be connected to an inner wall/side/part of a light fixture by using one or more bolts/nails/screws 101, insertable into designated openings 128*a* of corresponding connecting elements 128 of the second member 120B.

Figure 2:
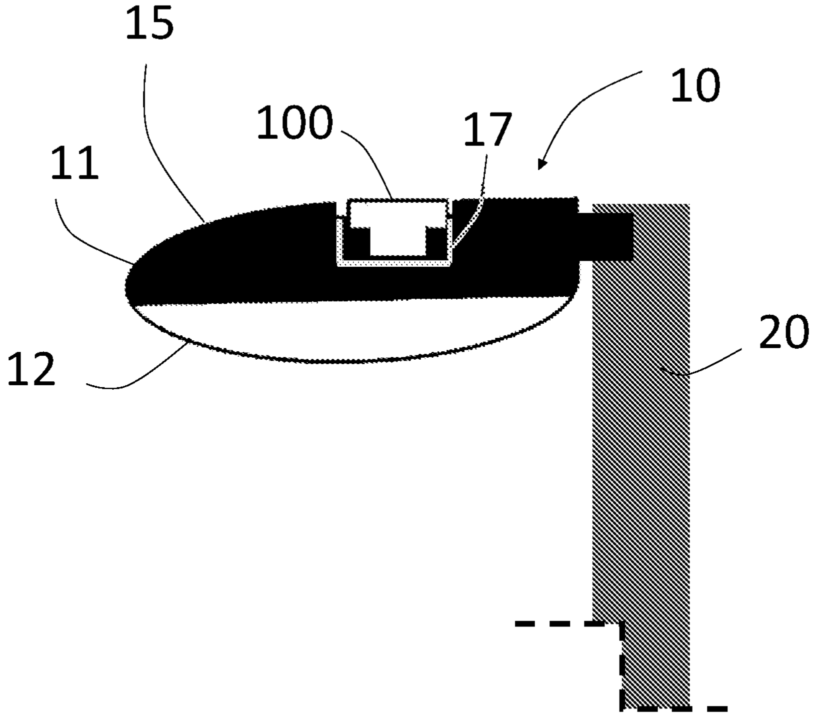
FIG. 2 shows a schematic illustration of a light fixture with an internal control device installed in a cavity of the light fixture, according to some embodiments.
Figure 3:
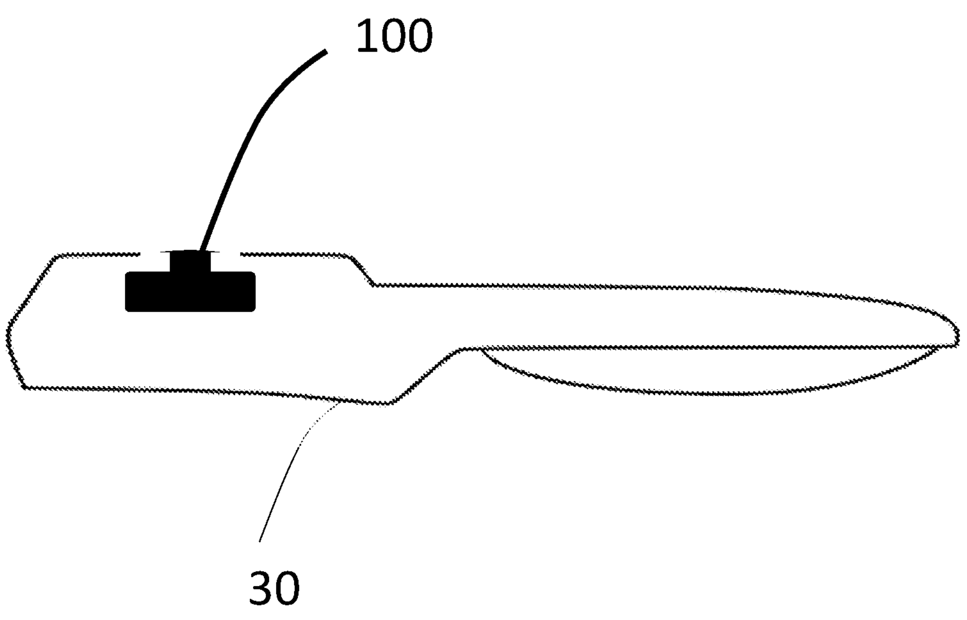
FIG. 3 shows an isometric view of a light fixture with an internal control device installed therein such that the internal control device only slightly protrudes from an outer surface of a casing of the light fixture, according to some embodiments.

According to some embodiments, as shown in FIG. 1B, FIG. 2 and FIG. 3, the internal control device 100 may be releasably connected to a casing wall of the light fixture 10, such that only the lid 123 of the internal control device 100 is visible from an outer surface of the light fixture's 10 casing wall 12, such that most of the internal control device 100 and its internal controller 110 are completely located inside a cavity of the light fixture 10. In other embodiments, the lid 123 of the internal control device 100 may be designed to be coplanar with the outer surface of the casing of the light fixture 10.

As seen in FIG. 2, the light fixture 10 may be held by a support such as support post 20. The light fixture 10 may also include a casing 15 that has two parts 11 and 12 releasably connectable to one another.

According to some embodiments, the casing 15 may also include a designated internal holder for holding the internal control device 100 such as a socket 17 designed such that the internal controller device 100 can fit therein and be releasably fastened to the casing 15 of the light fixture 10 in a weatherproof/sealable manner and also such that an external side of the lid 123 of the controller encasement 120 will be coplanar or flush with the outer surface of the casing 15 of the light fixture 10.

The design, along with the one or more sealing rings 124 and/or 125, ensures that the internal controller 110 that includes all electronical, electrical, communication and/or sensory means is weather/water-protected/proof and optionally also thermally isolated from an external environment of the light fixture 10 in which it is installed.

According to some embodiments, the internal controller 110 may be configured to receive wireless signals from one or more external devices, and control the light fixture at least by controlling operation of one or more illuminators of the light fixtures, based on received signals, which may be indicative of readable operational commands. The controlling of the light fixture may include one or more of:

- switching on/off of each illuminator of the light fixture 10;
- controlling dimming of each of the one or more illuminators;
- controlling one or more sensors embedded in the light fixture 10 and/or external thereto;
- controlling power supply to each illuminator and/or sensor;
- processing wirelessly received signals/data from the external device and/or from one or more sensors;
- receiving and analyzing signals/data arriving from one or more sensors; and/or
- wirelessly transmitting signals to the one or more external devices;
- enabling programming (e.g., by enabling adjusting programs) control commands, parameter values for control commands etc.;
- enabling autonomous operation of the internal controller 110;
- reading and/or writing configuration information.

According to some embodiments, the internal controller 110 may be implemented by use of a printed circuit board (PCB) using at least one on-chip receiver or transceiver.

According to some embodiments, the communication between the internal controller 100 and the one or more external devices may be implemented via any one or more wireless communication techniques, protocols, networks, formats, links, etc.

For example, the communication between the internal controller 110 of the internal control device 100 may be implemented using radio frequency (RF) or optical based communication.

According to some embodiments, the communication between the internal controller 110 and the one or more external devices may be implemented via one or more wireless relay devices, such that users of remote and/or mobile devices such as mobile phones remote control station can control light fixtures operation and/or view monitoring data/information from afar.

The internal controller 110 of the internal control device 100 may be switchably connected to power supply line/connection of one or more illuminators of the light fixture 10 such that when wirelessly receiving a signal from an external device it simply switches the illuminator(s) on or off. This can be done by using a simple switch that can only connect and cut-off power supply upon receiving a signal of a specific frequency and/or intensity by reversing current state of the power supply, i.e., if the illuminator(s) is (are) currently in an activated state (on) the internal controller will switch the illuminator(s) to be deactivated (off) by cutting off/preventing power supply thereto, and vice versa.

In additional or alternative embodiments, the internal controller 110 may control dimming of the one or more illuminators of the light fixture 10, according to intensity/peak/power-level-current/voltage value of the signal wirelessly transmitted from the external device, such that a user can wirelessly control also dimming of lights of one or more light fixtures, using the external device.

According to some embodiments, at least part of the controller encasement 120, such as the lid 123, may be made of a material that does not interrupt, least interrupts or even assists with the wireless communication between the internal controller 110 and 5 the external device(s).

According to some embodiments, the power supply source supplying power to the internal controller 110 may be separate from the power supply source of the illuminator(s) of the light fixture 10 or the same. For example, the internal controller 110 may be connectable directly to the power supply line (electricity wire) of the light fixture 10. Alternatively, the internal controller 110 may include one or more replaceable and/or chargeable batteries for supplying power thereto.

In some embodiments, the internal control device may be simply placed within a sealable socket/niche/indentation/recess already existing in the casing of the light fixture, having a lid that seals the socket/recess of the fixture's casing OR using a lid/part of the internal control device that will also serve as a lid/cap/cover of the fixture's socket/recess.

Figure 4:
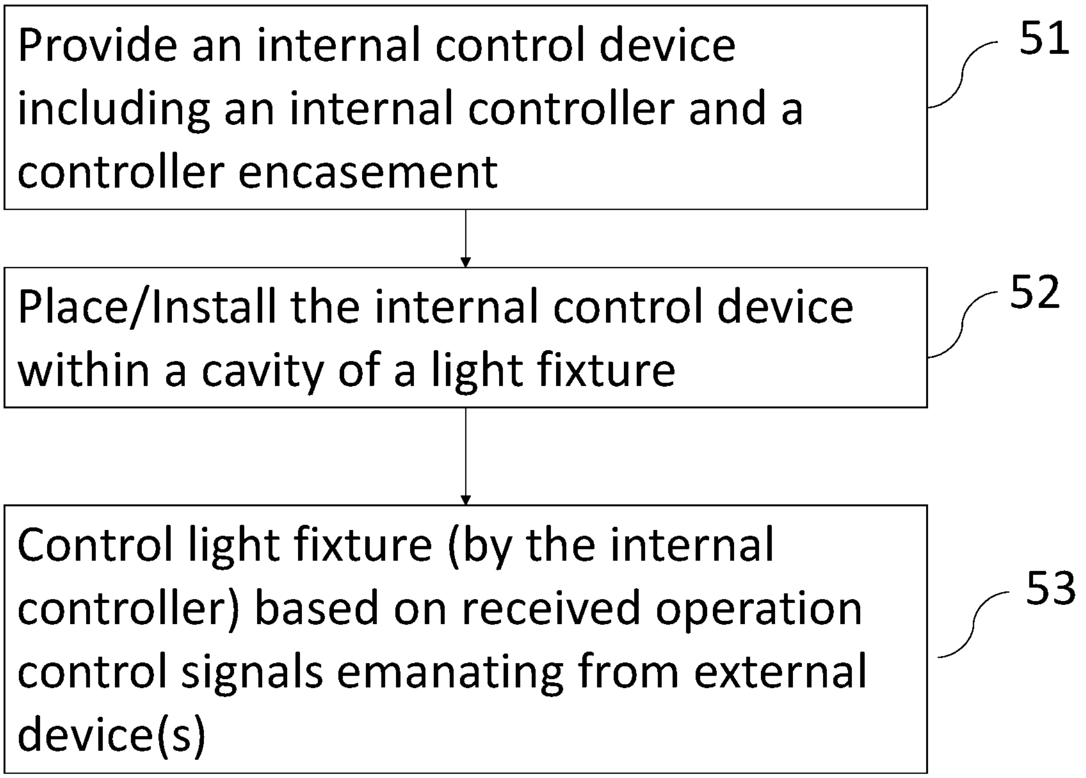
FIG. 4 is a flowchart, schematically illustrating a method/process for controlling one or more light fixtures via a single main external device, each fixture having its own internal control device installed therein, according to some embodiments.

Reference is now made to FIG. 4, listing main steps of a method for installing and using an internal control device that wirelessly communicates with one or more external devices, according to some embodiments. This system may include at least the following steps:

- providing an internal control device 51;
- placing/installing the internal control device within a cavity of a light fixture 52, for example by placing the internal control device within the light fixture's cavity or by placing/installing the internal control device to a designated opening/niche/socket/recess that is internal in respect to a casing of the light fixture or by connecting the internal control device to an internal wall of the light fixture casing such that at least most of the internal control device is located within the cavity of the light fixture and preferably also protected from weather/temperature/humidity/water etc.; and
- control the light fixture based on received wirelessly transmitted signals emanating from the external device(s) 53.

Figure 5:
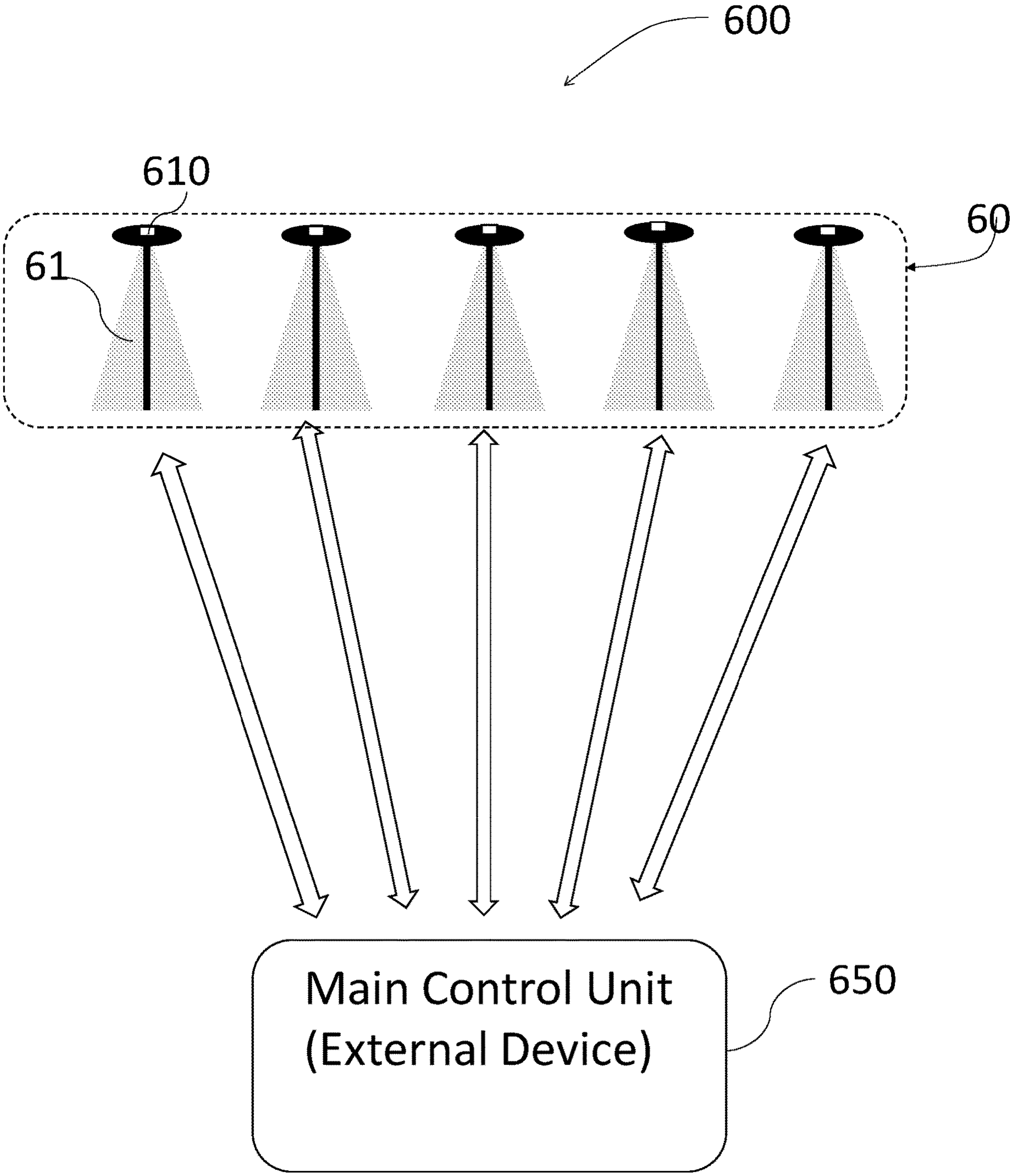
FIG. 5 is a block diagram, schematically illustrating a system for managing and controlling a group of (street/road) light fixtures, each having an internal control device installed therein, where the light fixtures are controlled via an external main control unit (as an external device), which communicates with each internal control device of each light fixture of the group, according to some embodiments.

Reference is now made to FIG. 5 schematically illustrating a system 600 that enables controlling operation of a group 60 of light fixtures 61, each light fixture 61 having an internal control device 610 installed therein using a main control unit 650 serving as the external device for enabling at least controlling operation of each of the light fixtures 61 of the group 60, according to some embodiments, by wireless transmission of signals to each internal control device 610, receivable via a receiver or transceiver of the internal controller of the internal control device 610 of the corresponding light fixture.

To be able to control each light fixture operation separately and independently, each internal controller of each internal control device 610 of a specific light fixture may be set to receive a distinguishing signal or signal part such as a distinguishing different transmitted signal frequency.

Figure 6:
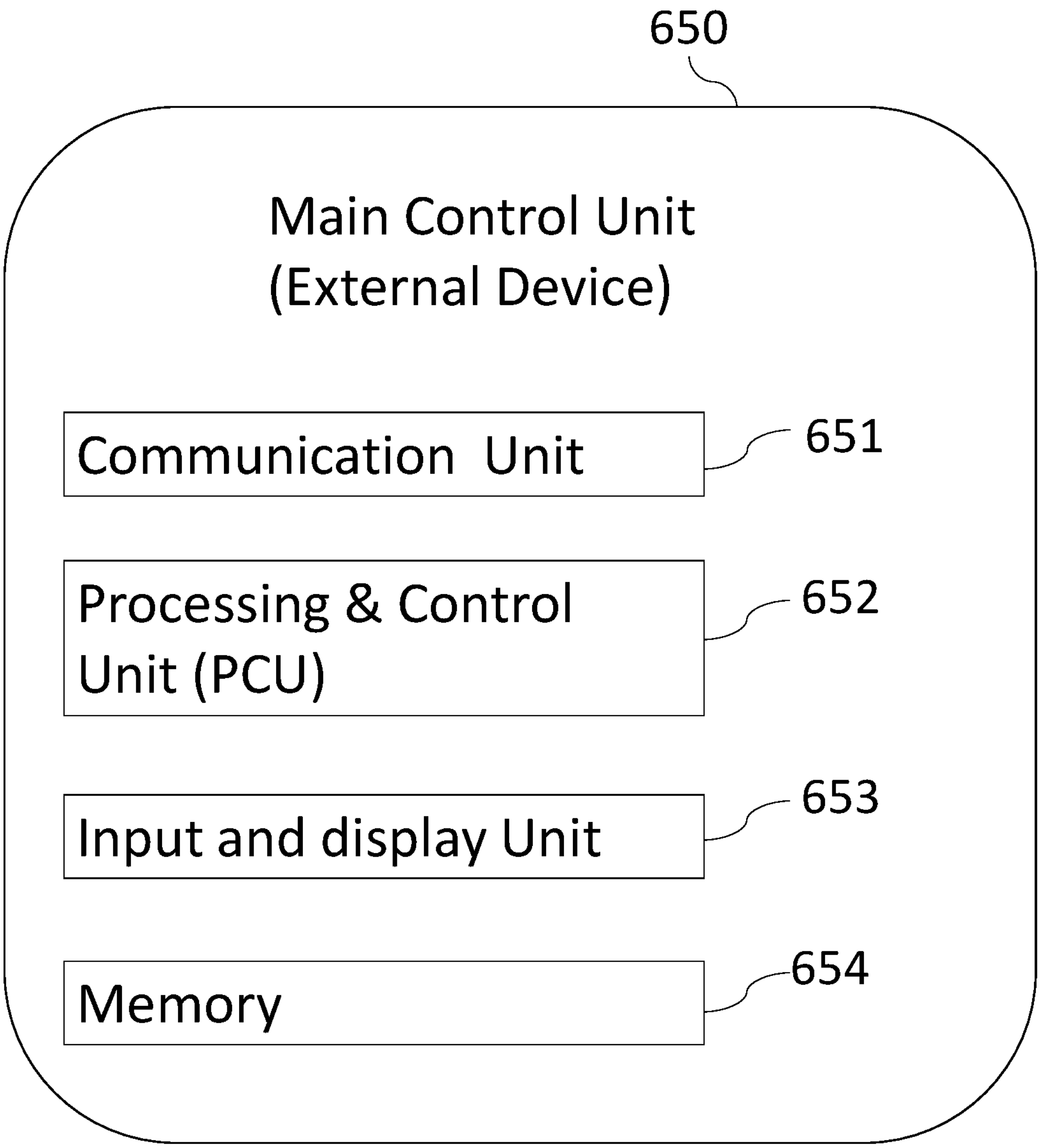
FIG. 6 shows optional modules of the main control unit of the external device of the system, illustrated in FIG. 5.

FIG. 6 shows optional modules/units of the main controller 650, according to some embodiments including one or more of:

- a communication unit 651 including one or more receivers and/or transceivers for receiving wirelessly transmitted signals;
- a processing and/or control unit 652 configured at least to operate one or more light fixtures 61 based on received signals;
- (optionally) an input and/or display unit 653 for enabling users to receive and view displayed information and/or to input control related input;
- (optionally) a memory 654 for retrievable storing of data.

According to some embodiments, the communication unit 651 may also be configured to receive data/signals (whether via wireless and/or wired communication network(s)) from one or more sensors, located within, over and/or externally to the light fixtures 61. The sensor(s) may be used to monitor one or more operational/functionality related properties of the specific light fixture 61 and/or of all light fixtures 61 of the group 60.

According to some embodiments, the processing and/or control unit 652 may also be configured to process/analyze signals/data arriving from the main controller 650 and/or the sensor(s) to determine the desired operation of the internal controller 610 commanded by the main control unit 650, identify impairments of the internal controller 610 and/or of the light fixture 61, etc. and optionally transmit signals indicative of such information to the main control unit 650.

Figure 7:
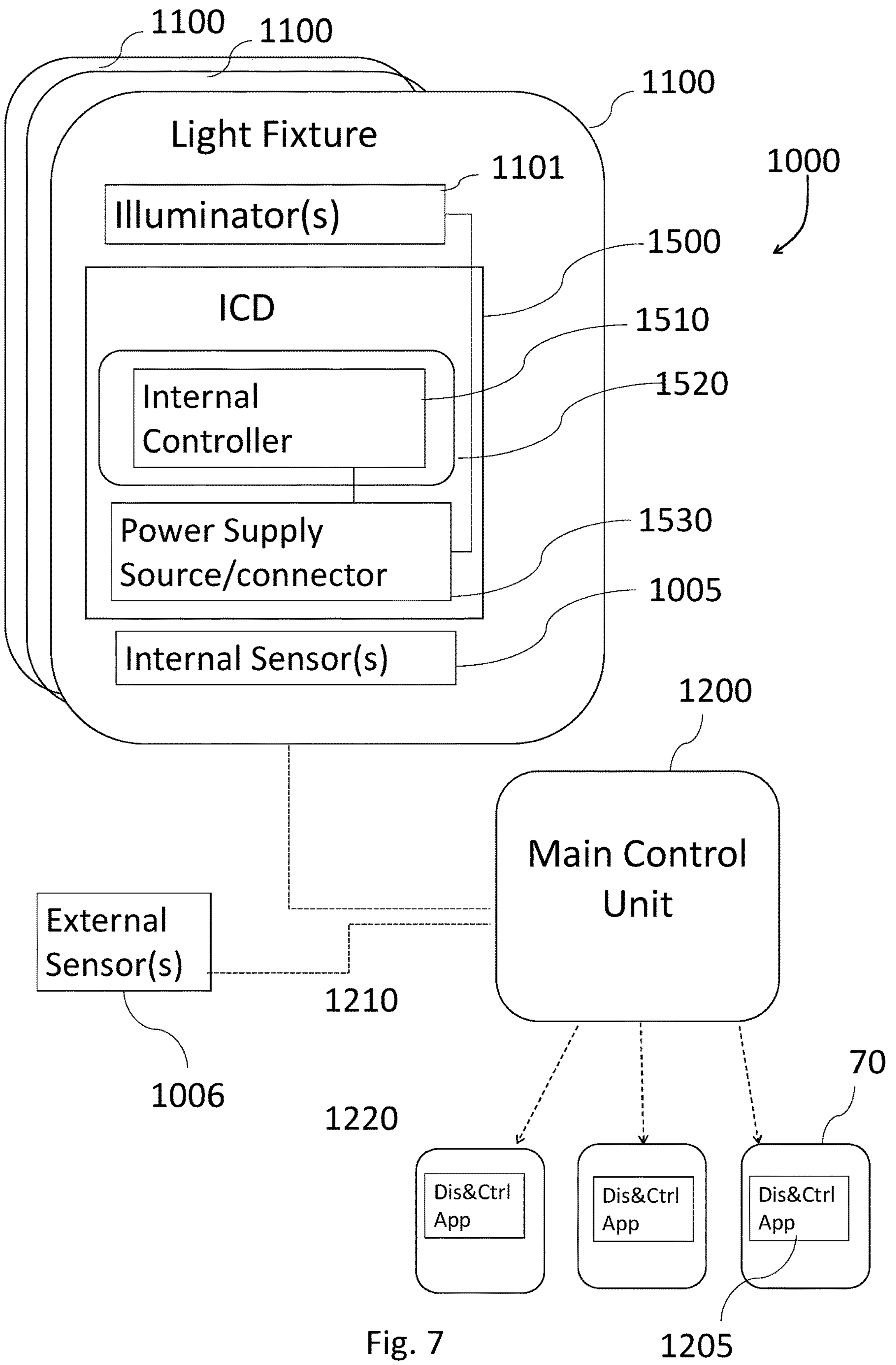
FIG. 7 is a block diagram, schematically illustrating a system for managing, monitoring and/or controlling a group of light fixtures also using one or more sensors to monitor various properties of the system, according to other embodiments.

Reference is now made to FIG. 7, schematically illustrating a system 1000 for managing illumination of an area, via a main control unit 1200, according to some embodiments.

The system 1000 may be configured to manage illumination of an area, using multiple light fixtures 1100 including one or more illuminators 1101 each having an internal control device (ICD) such as ICD 1500 installed within a cavity thereof, the controlling performed via a main control unit 1200 operating as the main external device, also enabling multiple end users, using end devices 70 such as a cloud service, a computer, a mobile phone, a tablet device etc. to view information relating to illumination management properties and/or to control the illumination of the area via their personal end devices, by communicating with the main control unit 1200 which can operate the light fixtures of the system 1000 according to control commands/information received from end devices 70. A designated application 1205 may be used to enable users to view displayed information and/or control illumination via their end devices 70.

According to some embodiments, the ICD 1500 may include an internal controller 1510; a controller encasement 1520; and a separate power supply source 1530 or connecting means for connecting to the power line supplying power to the light fixture 1100.

According to some embodiments, the system may also include one or more sensors such one or more internal sensors 1005 embedded in or attached to the respective light fixture 1100, and/or one or more external sensors 1006, positioned externally to the light fixtures 1100.

According to some embodiments, one or more of the internal controller 1510, the main control unit 1200 and/or the designated application 1205 may be configured to receive, transmit (relay), store and/or process sensor data from one or more of the internal and/or external sensors 1005 and/or 1006, to monitor performances and/or functionality of each light fixture 1100 of the system of the entire illumination properties. The sensors 1005/1006 may additionally or alternatively be used to monitor the actual area and/or other external attributes.

One or more of the internal sensors 1005 may be configured to sense one or more physical/illumination properties of the corresponding light fixture 1100 to which it is attached or of a proximal environment of the corresponding light fixture 1100 such as nearby temperature and/or other environmental factors, pedestrian motion, vehicle presence, vehicle motion, illuminator(s) 101 nearby temperature, illumination properties such as illumination intensity, electrical current/power related properties for power supplied to the illuminator(s) 1101 of the corresponding light fixture 1100, etc.

One or more of the external sensors 1006 may be configured to sense properties associated with the area such as illumination distribution of the entire area to be monitored and illuminated by the system 1000, etc.

According to some embodiments, the internal control device may be designed such as to enable installation thereof within a cavity of a light fixture in a manner that uses an already existing design of one or more types of light fixtures, by designing the configuration, size, fastening properties, dimensions and/or shape of the internal control device such as to fit existing design(s) of one or more "of-the-shelf" light fixtures.

EXAMPLES

Example 1 is an internal control device for connecting to a light fixture that includes at least a casing forming a cavity therein, one or more lamp-connectors for connecting to one or more illuminators locatable within the cavity, the internal control device comprising at least:

(i) an internal controller configured at least to control operation of the one or more illuminators of the light fixture, wherein the internal controller is configured to wirelessly communicate with at least one external device, located externally in respect to the light fixture and internal control device, wherein the at least one external device is configured at least for controlling one or more operations of the internal controller; and (ii) a controller encasement configured to be locatable in the cavity of the light fixture, wherein the controller encasement is configured to removably connect to the casing of the light fixture, such that the internal controller is kept within the cavity of the light fixture, and wherein only an outer surface of the controller encasement is located over an outer surface of the casing of the light fixture.

In example 2, the subject matter of example 1 may include, wherein the internal controller is connected to and/or embedded in a cavity or recess formed at an inner side of the controller encasement.

In example 3, the subject matter of any one or more of examples 1 to 2 may include, wherein the internal control device is connected to a main power supply source and/or to an auxiliary power supply source In example 4, the subject matter of any one or more of examples 1 to 3 may include, wherein the internal controller controls power supply to one or more elements of the light fixture.

In example 5, the subject matter of any one or more of examples 1 to 4 may include, wherein the external device is configured at least for controlling dimming of the at least one of the one or more illuminators of the light fixture, by controlling the internal controller based on user and/or machine-controlled operation of the external device.

In example 6, the subject matter of any one or more of examples 1 to 5 may include, wherein the internal controller is releasably attachable to the controller encasement.

In example 7, the subject matter of any one or more of examples 1 to 6 may include, wherein the controller encasement is designed such that part thereof protrudes from an outer surface of light fixture.

In example 8, the subject matter of any one or more of examples 1 to 6 may include, wherein the controller encasement is designed such that it does not protrude from the external surface of the casing of the light fixture.

In example 9, the subject matter of any one or more of examples 1 to 8 may include, wherein the controller encasement is configured such that it minimizes damaging wireless communication between the internal controller and the at least one external device.

In example 10, the subject matter of any one or more of examples 1 to 9 may include, wherein the internal controller comprises at least one receiver for receiving wirelessly transmitted control signals from the external device.

In example 11, the subject matter of any one or more of examples 1 to 10 may include, wherein the internal controller is electrically connectable via at least one electrical wire and/or electrical connector, to each of one or more lamp-connectors of the light fixture that are designed to electrically connect to each of the one or more illuminators of the light fixture, in a manner that enables the internal controller to separately control power supply to each of the one or more illuminators connectable to the one or more lamp-connectors.

In example 12, the subject matter of any one or more of examples 1 to 11 may include, wherein the internal control device further comprises one or more sensors for sensing one or more characteristics of the respective light fixture and/or of an external environment of the respective light fixture.

In example 13, the subject matter of any one or more of examples 1 to 12 may include, wherein the internal controller is configured to control one or more of:

power supply to each of the one or more illuminators of the light fixture;

switching between two or more modes of the of operations of the fixture device and/or of each of the one or more illuminators;

wirelessly and/or non-wirelessly receiving and/or transmitting signals and/or data from one or more sensors and/or other devices of the internal controller, the light fixture and/or one or more sensors and/or other devices that are external to the light fixture and internal controller.

In example 14, the subject matter of any one or more of examples 1 to 13 may include, wherein the casing of the light fixture has at least two parts: a fixture-casing and a window seal connectable to one another, to form the inner cavity in which the inner controller and the lamp-connectors and one or more illuminators connecting thereto, are located, wherein the window seal is at least partially transparent to light at least within the visible spectral range.

In example 15, the subject matter of example 14 may include, wherein an inner side of the casing comprises a reflective coating for reflecting therefrom light emanating from the one or more illuminators.

In example 16, the subject matter of any one or more of examples 1 to 15 may include, wherein the internal controller is powered by a separate power supply source, in respect to the power supply source of components of the light fixture.

In example 17, the subject matter of any one or more of examples 1 to 15 may include, wherein the internal controller is powered via the same power supply source of the one or more illuminators of the light fixture.

In example 18, the subject matter of any one or more of examples 1 to 17 may include, wherein the internal control device is further configured to be used as a lamp-socket for holding thereby one or more lamp illuminators and connecting the one or more lamp-illuminators to an electricity line for supplying power thereto.

In example 19, the subject matter of any one or more of examples 1 to 18 may include, wherein the socket comprises at least two parts: a container part and a cover part, releasably attachable to one another, wherein the socket parts are configured such that the internal controller is located in an inner socket-cavity formed by the container part of the socket and can be closed by the cover part.

In example 20, the subject matter of claim 19 may include, wherein the container part comprises two releasably connectable elements and the cover part comprises a top including a protruding head and an insertable portion and at least one sealer strap locatable between a protruding head of the top portion to the external surface of the casing of the light fixture.

Example 21 is an internal controller for controlling operation of a light fixture, the light fixture comprising a casing forming a cavity therein, one or more lamp-connectors for connecting to one or more illuminators all located within the cavity, wherein the internal controller is configured to control operation of the light fixture and to wirelessly communicate with at least one external device, external in respect to the internal controller and to lighting fixture, wherein the internal controller is locatable internally in respect to an inner side of the controller encasement and in respect to the light fixture, for preventing exposure of the internal controller to external environment, such that once the internal control device is positioned in the cavity of the light fixture, only an outer surface of the controller encasement is located over an outer surface of the casing of the light fixture.

In example 22, the subject matter of example 21 may include, wherein the internal controller is connected to and/or embedded in the controller encasement, such that the internal controller does not protrude from the casing of the light fixture.

In example 23, the subject matter of any one or more of examples 21 to 22 may include, wherein the internal controller is configured to control at least dimming operation of at least one of the one or more illuminators of the light fixtures.

In example 24, the subject matter of any one or more of examples 21 to 23 may include, wherein the internal controller is configured to control one or more of:

power supply to each illuminator of the light fixture;

operation of other one or more devices associated with the light fixture and located internally and/or externally in respect to the light fixture and/or to one or more devices associated with the light fixture that are connected to the signal lines of the light fixture;

receiving and/or transmitting data and/or signals from one or more sensors of: the internal controller, the light fixture, and/or sensors external to the light fixture.

In example 25, the subject matter of any one or more of examples 21 to 24 may include, wherein the at least one external device is configured at least for controlling dimming of the at least one of the one or more illuminators of the light fixture, by controlling the internal controller based on user and/or machine-controlled operation of the external device.

In example 26, the subject matter of any one or more of examples 21 to 25 may include, wherein the internal controller is releasably attachable to the controller encasement.

In example 27, the subject matter of any one or more of examples 21 to 26 may include, wherein the socket is designed such that part thereof protrudes from the external surface of light fixture.

In example 28, the subject matter of any one or more of examples 21 to 26 may include, wherein the socket is designed such that it does not protrude from the external surface of the casing of the light fixture.

In example 29, the subject matter of any one or more of examples 21 to 28 may include, wherein the socket is located within an inner cavity of the socket formed by the shape of the socket.

In example 30, the subject matter of any one or more of examples 21 to 29 may include, wherein the socket is designed for preventing or reducing degradation of quality of wireless communication between the internal controller and the external device.

In example 31, the subject matter of any one or more of examples 21 to 30 may include, wherein the internal controller comprises at least one receiver for receiving wirelessly transmitted control signals and at least one internal control-device at least for controlling power delivered to at least one of the one or more illuminators of the light fixtures.

In example 32, the subject matter of any one or more of examples 21 to 31 may include, wherein the internal controller is electrically connectable via at least one power line, to each of the one or more lamp-connectors of the light fixture, in a manner that enables the internal controller to separately control power supply to each of the one or more illuminators connectable to the one or more lamp-connectors.

In example 33, the subject matter of any one or more of examples 21 to 32 may include, wherein the internal controller is powered by a separate power supply source n respect to power supply source of the light fixture.

In example 34, the subject matter of any one or more of examples 21 to 32 may include, wherein the internal controller is powered via the same power supply source of the one or more illuminators.

Example 35 is a system for controlling one or more light fixtures, the system comprising at least:

a) at least one external device, located externally to the one or more light fixtures, to the controller encasement and to the internal controller; and b) at least one internal control device, each internal control device comprising at least:

(i) an internal controller configured at least to control operation of the one or more illuminators of the light fixture, wherein the internal controller is configured to wirelessly communicate with at least one external device, located externally in respect to the light fixture and internal control device, wherein the at least one external device is configured at least for controlling one or more operations of the internal controller; and (ii) a controller encasement configured to be locatable in the cavity of the light fixture, wherein the controller encasement is configured to removably connect to the casing of the light fixture, such that the internal controller is kept within the cavity of the light fixture, and wherein only an outer surface of the controller encasement is located over an outer surface of the casing of the light fixture, wherein the at least one external device is configured to wirelessly transmit signals or data to each internal controller of each internal control device for controlling operation at least of the one or more illuminators of each respective light fixture.

Example 36 is a method for controlling one or more light fixtures, the method comprising at least:

providing an internal control device of any one or more of claims 1 to 20, for each light fixture of a group of light fixtures;

providing at least one external device configured to control each light fixture of the group by wirelessly communicating with each light fixture; and controlling operation at least of the one or more illuminators of each specific light fixture of the group at least by transmission of wireless signals to the specific light fixture.

In example 37, the subject matter of example 36 may include, wherein the method further comprises releasably installing each internal control device in a casing of its corresponding light fixture, such that the internal controller is located within the cavity of the corresponding light fixture and only part of the controller encasement of the light fixture of the internal control device penetrates through an external surface of the light fixture, and is coplanar with an outer surface of the corresponding light fixture's casing.

In example 38, the subject matter of any one or more of examples 36 to 37 may include, wherein each internal control device is installed within a cavity of a corresponding light fixture in a manner that uses already existing design of the corresponding light fixture, by designing the configuration, size, fastening properties, dimensions and/or shape to fit existing design of one or more light fixtures in which the internal control device is to be installed.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. An internal control device for connecting to a light fixture that includes at least: (a) a casing forming a cavity therein, (b) one or more illuminators locatable within the cavity of the light fixture, and (c) one or more lamp-connectors connectable to the one or more illuminators of the light fixture, wherein the internal control device comprises at least:

(i) an internal controller, connectable to the one or more illuminators of the light fixture, wherein the internal controller is configured at least to control operation of the one or more illuminators of the light fixture, as well as to wirelessly communicate with at least one external device, located externally in respect to the light fixture, wherein the at least one external device is configured at least for controlling one or more operations of the internal controller; and (ii) a controller encasement configured encasing the internal controller, wherein the internal controller is locatable within the cavity of the light fixture, wherein the controller encasement is configured to removably connect to the casing of the light fixture, such that the internal controller is kept within the cavity of the light fixture, wherein only an outer surface of the controller encasement is located over an outer surface of the casing of the light fixture, wherein the controller encasement is designed such that it does not protrude from the external surface of the casing of the light fixture, and wherein each of the at least one external device is configured to wirelessly communicate with a group of light fixtures through the internal control device of each light fixture of the group of light fixtures, for controlling each of the light fixtures.

2. The internal control device of claim 1, wherein the internal controller is connected to and/or embedded in a cavity or recess formed at an inner side of the controller encasement.

3. The internal control device of claim 1, wherein the internal control device is connected to a main power supply source and/or to an auxiliary power supply source.

4. The internal control device of claim 1, wherein the internal controller controls power supply to one or more elements of the light fixture.

5. The internal control device of claim 1, wherein the external device is configured at least for controlling dimming of the at least one of the one or more illuminators of the light fixture, by controlling the internal controller based on user and/or machine-controlled operation of the external device.

6. The internal control device of claim 1, wherein the internal controller is releasably attachable to the controller encasement.

7. The internal control device of claim 1, wherein the controller encasement is configured such that it minimizes damaging wireless communication between the internal controller and the at least one external device.

8. The internal control device of claim 1, wherein the internal controller comprises at least one receiver for receiving wirelessly transmitted control signals from the external device.

9. The internal control device of claim 1, wherein the internal controller is electrically connectable via at least one electrical wire and/or electrical connector, to each of one or more lamp-connectors of the light fixture that are designed to electrically connect to each of the one or more illuminators of the light fixture, in a manner that enables the internal controller to separately control power supply to each of the one or more illuminators connectable to the one or more lamp-connectors.

10. The internal control device of claim 1 further comprising one or more sensors for sensing one or more characteristics of the respective light fixture and/or of an external environment of the respective light fixture.

11. The internal control device of claim 1, wherein the internal controller is configured to control one or more of:

power supply to each of the one or more illuminators of the light fixture;

switching between two or more modes of the of operations of the fixture device and/or of each of the one or more illuminators;

wirelessly and/or non-wirelessly receiving and/or transmitting signals and/or data from one or more sensors and/or other devices of the internal controller, the light fixture and/or one or more sensors and/or other devices that are external to the light fixture and internal controller.

12. The internal control device of claim 1, wherein the casing of the light fixture has at least two parts: a fixture-casing and a window seal connectable to one another, to form the inner cavity in which the inner controller and the lamp-connectors and one or more illuminators connecting thereto, are located, wherein the window seal is at least partially transparent to light at least within the visible spectral range.

13. The internal control device of claim 12, wherein an inner side of the casing comprises a reflective coating for reflecting therefrom light emanating from the one or more illuminators.

14. The internal control device of claim 1, wherein the internal controller is powered by a separate power supply source, in respect to the power supply source of components of the light fixture.

15. The internal control device of claim 1, wherein the internal controller is powered via the same power supply source of the one or more illuminators of the light fixture.

16. The internal control device of any claim 1, wherein the internal control device is further configured to be used as a lamp-socket for holding thereby one or more lamp illuminators and connecting the one or more lamp-illuminators to an electricity line for supplying power thereto.

17. The internal control device of claim 1, wherein the socket comprises at least two parts: a container part and a cover part, releasably attachable to one another, wherein the socket parts are configured such that the internal controller is located in an inner socket-cavity formed by the container part of the socket and can be closed by the cover part.

18. The internal control device of claim 17, wherein the container part comprises two releasably connectable elements and the cover part comprises a top including a protruding head and an insertable portion and at least one sealer strap locatable between a protruding head of the top portion to the external surface of the casing of the light fixture.

19. A method for controlling a group of light fixtures, the method comprising at least:

providing an internal control device of claim 1, for each light fixture of the group of light fixtures;

providing at least one external device configured to control each light fixture of the group of light fixtures by wirelessly communicating with each light fixture of the group of light fixtures; and controlling operation at least of the one or more illuminators of each specific light fixture of the group of light fixtures at least by transmission of wireless signals to each specific light fixture of the group of light fixtures.

20. The method of claim 19, wherein each internal control device is installed through the casing of the respective light fixture of the group of light fixtures and within a cavity of the respective light fixture in a manner that uses already existing design of the corresponding light fixture, by designing the configuration, size, fastening properties, dimensions and/or shape to fit existing design of one or more light fixtures in which the internal control device is to be installed.

21. An internal controller for controlling operation of a light fixture, the light fixture comprising: (a) a casing forming a cavity therein, (b) one or more illuminators locatable within the cavity of the light fixture, and (c) one or more lamp-connectors for connecting to one or more illuminators all located within the cavity, wherein the internal controller is configured to control operation of the light fixture and to wirelessly communicate with at least one external device, external in respect to the internal controller and to the light fixture, wherein the internal controller is locatable internally in respect to an inner side of a controller encasement and in respect to the light fixture, for preventing exposure of the internal controller to external environment, such that once the internal control device is positioned in the cavity of the light fixture, only an outer surface of the controller encasement is located over an outer surface of the casing of the light fixture, such that it does not protrude from the outer surface of the casing of the light fixture, wherein each of the at least one external device is configured to wirelessly communicate with a group of light fixtures through the internal controller of each light fixture of the group of light fixtures, for controlling each of the light fixtures, and wherein each internal control device is designed such that its encasement does not protrude from the external surface of the casing of the light fixture in which the internal control device is installed.

22. A system for controlling a group of light fixtures, the system comprising at least:

a) at least one external device, located externally to; the group of light fixtures of the system; and b) a plurality of internal control devices, each internal control device being located at a different light fixture of the group of light fixtures, and comprising at least:

(i) an internal controller configured at least to control operation of the one or more illuminators of the light fixture, wherein the internal controller is configured to wirelessly communicate with at least one external device, located externally in respect to the light fixture and internal control device, wherein the at least one external device is configured at least for controlling the internal controller; and (ii) a controller encasement configured to be locatable in a cavity of the light fixture, wherein the controller encasement is configured to removably connect to a casing of the light fixture, such that the internal controller is kept within the cavity of the light fixture, and wherein only an outer surface of the controller encasement is located over an outer surface of the casing of the light fixture, wherein each external device of the at least one external control device is configured to wirelessly transmit signals or data to each internal controller of each internal control device of each light fixture of the group of light fixtures, for controlling operation at least of the one or more illuminators of each respective light fixture of the group of light fixtures, wherein each internal control device is designed such that its encasement does not protrude from the external surface of the casing of the light fixture in which the internal control device is installed.

* * * * *